United States Patent [19]

Barbier et al.

[11] 4,300,048

[45] Nov. 10, 1981

[54] ALARM DETECTOR RESPONSIVE TO RATE CHANGE OF A MONITORED CONDITION

[75] Inventors: Daniel Barbier, Echibolles; Jean-Michel Ittel, Seyssinet-Pariset; Robert Poujois, Grenoble, all of France

[73] Assignee: Commissariat a l'Energie Atomique, Paris, France

[21] Appl. No.: 53,141

[22] Filed: Jun. 27, 1979

Related U.S. Application Data

[60] Division of Ser. No. 804,482, Jun. 7, 1977, which is a continuation of Ser. No. 538,218, Jan. 2, 1975, Pat. No. 4,065,758.

[30] Foreign Application Priority Data

Jan. 4, 1974 [FR] France ................................ 74 00295

[51] Int. Cl.$^{3}$ ................................................ G01J 1/00

[52] U.S. Cl. ................................ 250/338; 73/355 R; 250/349

[58] Field of Search ................ 250/211 R, 211 J, 338, 250/340; 356/51, 43; 73/355 R, 355 EM, 362 SC

[56] References Cited

U.S. PATENT DOCUMENTS 3,619,614 11/1971 Yamaka ............................ 73/355 R

OTHER PUBLICATIONS

Sze, "Physics of Semiconductor Devices", Bell Telephone Labs, John Wiley & Sons, 1969, pp. 659–663.

*Primary Examiner*—Davis L. Willis

*Attorney, Agent, or Firm*—Sughrue, Mion, Zinn, Macpeak & Seas

[57] ABSTRACT

A physical quantity such as temperature, infrared radiation or smoke is detected by means of a conversion device for emitting an alarm signal whose amplitude is representative of the intensity of the physical quantity. The detector comprises a unit for measuring relative variations of the signal in time, for comparing them with a preset threshold level and for actuating the alarm when they exceed the threshold level.

3 Claims, 9 Drawing Figures

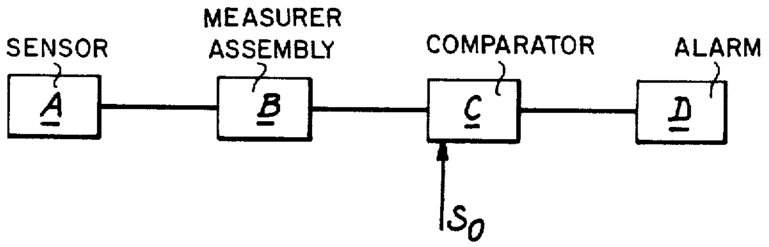
FIG. 1
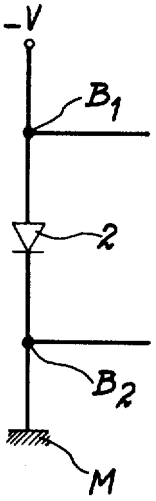
FIG. 3a
FIG. 3b
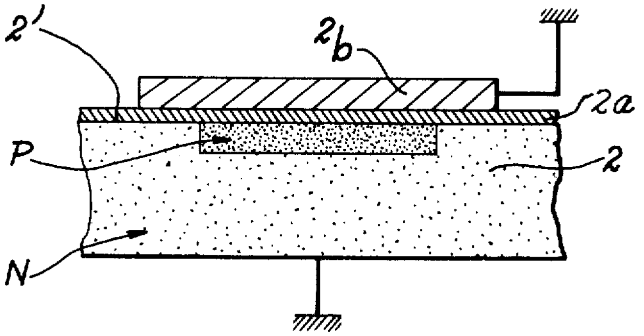

ALARM DETECTOR RESPONSIVE TO RATE CHANGE OF A MONITORED CONDITION

CROSS-REFERENCE TO RELATED APPLICATIONS

This application is a division of application Ser. No. 804,482, filed June 7, 1977, which is a continuation of application Ser. No. 538,218, filed Jan. 2, 1975, now U.S. Pat. No. 4,065,758.

BACKGROUND OF THE INVENTION

This invention relates to an alarm detector, that is to say a device which is capable of emitting an alarm signal when it detects a physical quantity at a level above a predetermined threshold. Devices of this type are particularly well suited to fire detection in a building. The physical quantity detected can in that case be temperature, infrared radiation or smoke.

SUMMARY OF THE INVENTION

An object of the invention is to provide an alarm detector which has greater reliability than detectors of the prior art.

Another object of the invention is to provide an alarm detector which triggers the alarm if the temperature or the infrared radiation exceeds a predetermined threshold value during a given time interval.

A further object of the invention is to carry out the transmission of the signal corresponding to the physical quantity to be detected (temperature, infrared radiation and the like) in the form of an electrical signal whose frequency is representative of the amplitude of the first signal.

Yet another object of the invention is to trigger the alarm system only if the relative increase in the signal exceeds a predetermined threshold value.

Again another object of the invention is to provide a device for sensing temperature or infrared radiations which is particularly well suited to alarm detectors. Still another object of the invention is to provide an alarm detector for triggering the alarm as a function of the infrared radiation emitted by the fire.

A further object of the instant invention is to provide an alarm detector for triggering the alarm as a function of the infrared radiation only if this latter is really produced by a fire, by comparing the frequency of variation of the signal with a preset frequency.

According to the present invention the foregoing and other objects are achieved by using a sensor to provide an electrical signal whose amplitude is based upon the physical quantity to be measured. This signal is then processed to determine the relative variation of the signal with respect to time. The relative variations are compared with a preset threshold level which if exceeded sets off an alarm.

BRIEF DESCRIPTION OF THE DRAWINGS

A clearer understanding of the invention will in any case be obtained from the following description of one embodiment of the invention which is given by way of non-limitative example, reference being made to the accompanying figures, in which:

FIG. 1 is a general diagram showing the main elements of the alarm detector;

FIGS. 3*a* and 3*b* are forms of construction of a device for sensing temperature and/or infrared radiation;

DESCRIPTION OF THE PREFERRED EMBODIMENT

The alarm detector in accordance with the invention as shown diagrammatically in FIG. 1 comprises a device A for converting a physical quantity (temperature, infrared radiations, smoke density) into an electrical signal whose amplitude is representative of the intensity of the physical quantity considered. As will become apparent hereinafter, said signal can be a voltage or a current. Said electrical signal is fed into an assembly B for measuring the relative variations of the signal as a function of time or in other words for measuring at regular intervals the slope of the curve which is representative of the signal as a function of time. The result of this measurement is introduced into a comparator C in which it is compared with a reference quantity $S_o$. If the result of the measurement is higher than $S_o$, the comparator emits a signal which actuates a device D and this latter emits an alarm signal which may be either a light or sound signal, for example.

Figure 2:
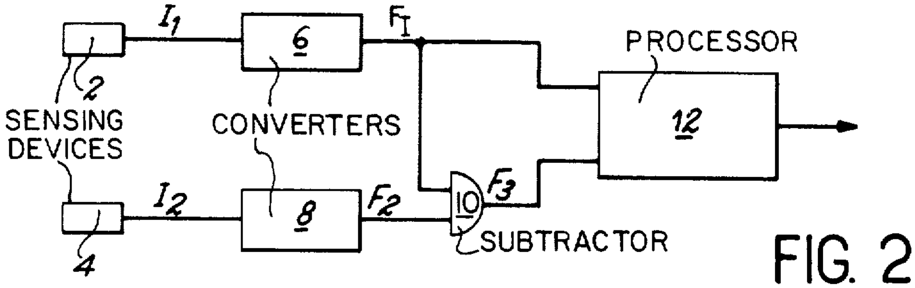
FIG. 2 is a general diagram showing the main elements of the detector in the case in which the detection is applied both to temperature and to infrared radiation.

The schematic diagram of FIG. 2 shows a fire detection installation which serves to carry out a detection as a function of the temperature level and as a function of the level of infrared radiation. The installation comprises a first detector 2 or sensing device which responds solely to temperature and a detector 4 or sensing device which responds both to temperature and to infrared radiations. The temperature-sensing device 2 can advantageously be constituted by a photodiode of known type masked by an aluminum sheet. A polarized photodiode of this type delivers a leakage current, the intensity of which is a function of the temperature. The sensing device 4 is preferably constituted by a photodiode of the same type as the one used in the sensing device 2. The photodiode 4 delivers a leakage current which is a function both of the temperature and of the infrared radiation.

The photodiodes employed can have the following characteristics:

dimensions: $350\times 200\mu$;

capacitance (of the reverse-biased diode) $\simeq 10$ pF;

a peripheral leakage current at 25° C. of the order of $10^{-14}$ A$\mu$;

a volume leakage current of the order of $10^{-16}$ A/$\mu^2$;

a sensitivity of the photodiode of 25 n A/mW/cm$^2$.

There is shown in FIG. 3*a* the arrangement of the diode 2 which is reverse-biased between the voltage −V and ground M. The leakage current i is collected at the terminals $B_1$ and $B_2$ of the diode 2.

There is shown in FIG. 3*b* one form of construction of the concealed diode 2 which is solely responsive to the thermal effect. There is formed on the active face 2′ of said diode a deposit of oxide 2*a* of silica, for example, on which is deposited a layer 2*b* of aluminum which is connected to ground.

The current $I_1$ delivered by the sensing device 2 drives a current-frequency converter 6. Similarly, the current $I_2$ delivered by the sensing device 4 drives a current-frequency converter 8. There is obtained at the output of the converter 6 an electrical signal $F_1$ having a frequency which is proportional to the current $I_1$, that is to say a function of the temperature detected by the sensing device 2; there is obtained at the output of the converter 8 an electrical signal $F_2$ having a frequency which is proportional to the current $I_2$, that is to say a function of the temperature and of the infrared radiation received by the sensing device 4. The signals $F_1$ and $F_2$ are fed to the input of a device 10 for generating an electrical signal $F_3$, the frequency of which is equal to the difference in frequencies of the signals $F_2$ and $F_1$. The signal $F_3$ therefore has a frequency which is directly a function of the infrared radiation alone. The signals $F_1$ and $F_3$ are fed into a processing system 12 which is capable of triggering the alarm.

The converters 6 and 8 are so designed as to give the same conversion ratio.

Figure 4:
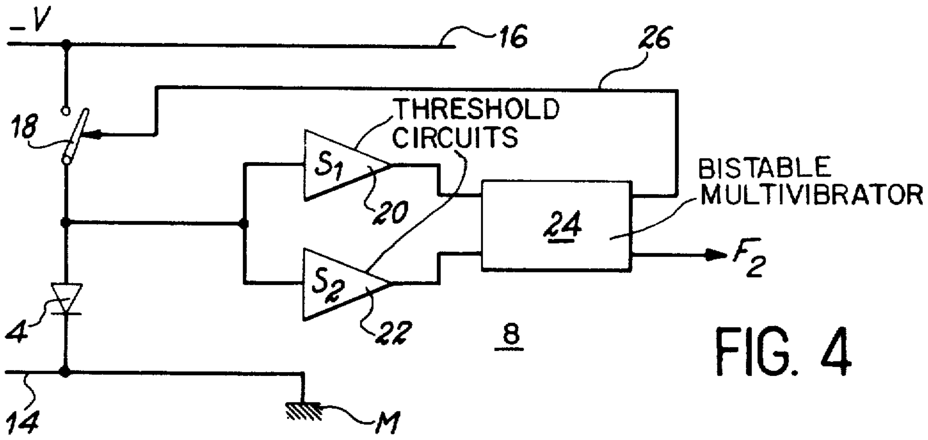
FIG. 4 is a diagram showing a particular form of construction of the intensity-frequency converter.
Figure 5:
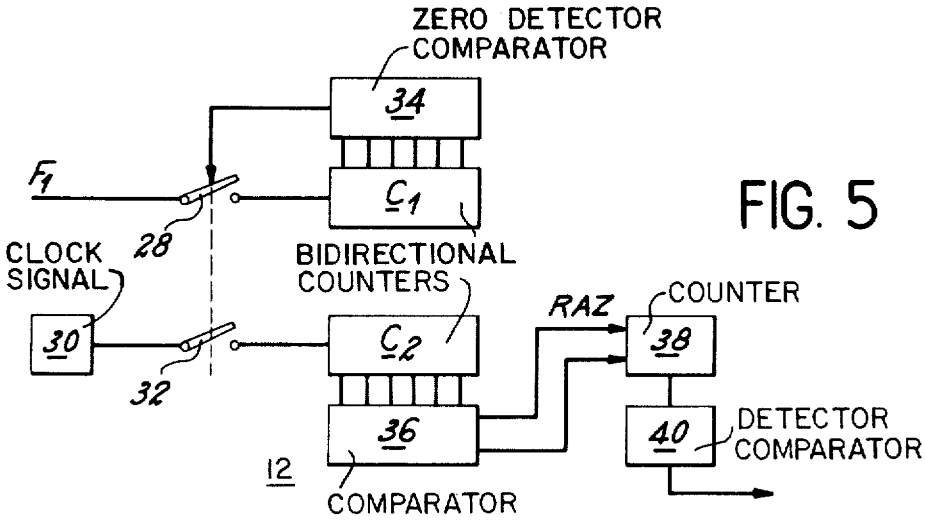
FIG. 5 is a diagram showing the processing of the signal in the logic circuit.

Referring to FIGS. 4 and 5, the preferred forms of construction of the current-frequency converters and of the logic circuit 12 will now be described. These descriptions of particular devices are clearly not intended to imply any limitation but correspond simply to preferred forms of construction. Especially in regard to the current-frequency converter described hereinafter, this converter is particularly well suited to the conditions of use. In other words, this is a relatively simple device for providing a current-frequency conversion which is compatible with the intended utilization of the output signal in the logic circuit 12. It would clearly be possible to employ other types of current-frequency conversion which are well known to those versed in the art.

FIG. 4 shows the photodiode 4 which is mounted between the ground lead 14 and the supply lead 16 at the voltage −V by means of the switch 18.

Figure 4A:
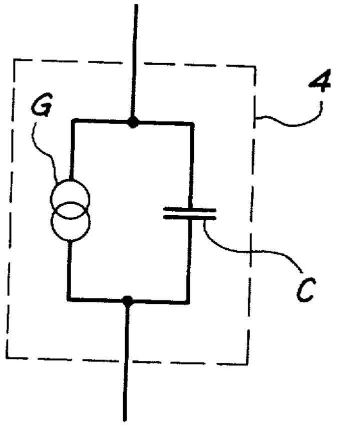
FIGS. 4*a*, 4*b* and 4*c* are equivalent circuits various types of sensing devices.

FIG. 4a shows the diagram which is equivalent to the diode 4; the capacitor C represents the capacitance of the reverse-biased diode and the stray capacitances; the current generator G produces the leakage current of said diode which is a function of the temperature and the degree of illumination received. In FIG. 4 it can be seen that the voltage developed across the terminals of the photodiode 4 is applied to the inputs of the threshold circuits 20 and 22. The circuit 20 corresponds to a preset top threshold level $S_1$ and the threshold circuit 22 corresponds to a preset bottom threshold level $S_2$. The outputs of the threshold circuits 20 and 22 drive a bistable device 24 of conventional type. The output $F_2$ of the bistable device 24 constitutes the output of the current-frequency converter. Said output is fed back to the switch 18 by means of the control lead 26.

The operation of the converter is as follows: the capacitor C of the photodiode is charged (switch 18 closed) until the terminal voltage attains the top threshold level $S_1$; at this moment, the switch 18 is opened. The diode 4 is discharged through its own leakage current until the bottom threshold level $S_2$ is attained. The switch 18 is then closed and the cycle is resumed. The output signal $F_2$ therefore has a frequency which is equal to that of the reversal of state of the bistable device controlled by the thresholds $S_1$ and $S_2$. The diagram of FIG. 4 shows the general constructional arrangement of this converter which can readily be designed in the form of an integrated circuit by means of MOS transistors. In particular, the switch 18 which is represented diagrammatically by a circuit-breaker can advantageously be formed by means of an MOS transistor and the lead 26 drives the input gate of said transistor. There is also interposed between the output of the bistable device and the control input of the switch 18 a correcting circuit which serves to make up for the fact that the bistable device does not have an infinite gain as soon as its threshold of reversal is attained. In accordance with the diagram of FIG. 2, two balanced photodiodes 4 and 2 are associated. In fact, the two current-frequency converters which utilize the charge and discharge of the capacitor constituted by the photodiodes must have the same coefficient of conversion in order to ensure that the difference between the two frequencies is in fact proportional to the infrared radiation alone.

There is shown in FIG. 5 a diagram of construction of the part of the system 12 which serves to process the signal $F_1$ delivered by the converter 6. This circuit is intended to trigger the alarm only in the event of a sufficient rise in temperature during a predetermined time interval. More precisely, the alarm can be operated by this circuit only if there is an increase in temperature, that is to say in the intensity of the signal $I_1$ or in the frequency of the signal $F_1$ (which amounts to the same thing) and if this increase is maintained over a predetermined period of time.

Before the processing circuits of FIG. 5 are described in detail, the principle of operation will now be briefly explained. This circuit essentially comprises a counter $C_1$ for counting the pulses which are characteristic of the temperature, for example the pulses of the signal $F_1$, and a counter $C_2$ for counting the pulses of a fixed-frequency clock signal H. In an initial time interval, the pulses of the signal $F_1$ and of the signal H are counted during a preset time interval $\theta_1$. The pulses delivered by the signal $F_1$ are counted during a time interval $\theta_1$ in the counter $C_1$ and the pulses delivered by the clock signal generator are counted in the counter $C_2$. If $F_{T1}$ designates the frequency of the signal $F_1$ during the time interval $\theta_1$, the counter $C_1$ has counted $C_{1,1}$ pulses (with $C_{1,1}=F_{T1}\,\theta_1$) and the counter $C_2$ has counted a number of pulses $C_{2,1}$ which has the value H $\theta_1$. The pulses delivered by the signals $F_1$ and H are then counted down by the counters $C_1$ and $C_2$ for a period $\theta_2$. The time interval $\theta_2$ is so defined that the counter $C_1$ is at zero after the pulses of the signal $F_1$ have been counted down during the time interval $\theta_2$. We then have $C_{1,2}=F_{T2}\,\theta_2$ and $C_{2,2}=H.\ \theta_2$, (where $F_{T2}$ represents the frequency of the signal $F_1$ during the period $\theta_2$ and we have the relation $C_{1,2}=C_{1,1}=C$. At the end of the time interval $\theta_2$, the state $\Delta C_2$ of the counter $C_2$ is equal to:

$$\Delta C_2 = C_{2,1} - C_{2,2} = H(\theta_1 - \theta_2)$$

$$\theta_1 = \frac{C}{FT_1} \text{ where } C = \text{constant}$$

$$\theta_2 = \frac{C}{FT_2}$$

$$\text{Therefore } H(\theta_1 - \theta_2) = HC\left(\frac{1}{FT_1} - \frac{1}{FT_2}\right)$$

$$= HC\left(\frac{FT_2 - FT_1}{FT_1 \times FT_2}\right)$$

$$= H \times \frac{C}{FT_1}\left(\frac{FT_2 - FT_1}{FT_2}\right)$$

-continued $$= H\theta_1\left(\frac{FT_2 - FT_1}{FT_2}\right)$$

and where $H\theta_1 = K$ (a constant)

$$\Delta C_2 = K\frac{FT_2 - FT_1}{FT_2}$$

and since $FT_1$ and $FT_2$ represent temperature values $FT_2 - FT_1$, is a change in Temperature ($\Delta T$).

$$\text{whence } \Delta C_2 = K \cdot \frac{F_{T2} - F_{T1}}{F_{T2}} = K' \frac{\Delta T}{T}$$

where K' is another constant and $\Delta T/T$ is the relative change in temperature. It is therefore observed that, as a result of the counting-up stage $\theta_1$ and of the counting-down stage $\theta_2$, the state of the counter $C_2$ is proportional to the relative rise in temperature. In order that the indications of the sensing device should correspond effectively to a fire, it must be ensured that the relation rise in temperature in respect of each period of measurement ($\theta_1 + \theta_2$) is higher than a predetermined threshold level, which is detected by comparing the value of $\Delta C_2$ with a pre-established threshold level N. In order to ensure that a fire has in fact taken place, the threshold level N of relative temperature rise must be exceeded during n periods of consecutive measurements. These two operations are accordingly performed by the logical system which is shown in FIG. 5 and which will now be described.

The signal $F_1$ drives the bidirectional counter $C_1$ through the switch 28. Similarly, the clock signal generator H is connected to the input of the bidirectional counter $C_2$ by means of the switch 32, the switches 32 and 28 being coupled together. Control of bidirectional counting of the counters $C_1$ and $C_2$ is wired in such a manner as to ensure counting-up during the first stage ($\theta_1$) and counting-down during the second stage ($\theta_2$). In the first stage, the switches 28 and 32 are closed during a fixed and preset time interval $\theta_1$. During the second stage, closing of the switches is controlled with a preset time-lag with respect to the instant of opening of said switches at the end of the first stage, said switches being closed again when the counter $C_1$ has returned to zero. The counter $C_1$ is accordingly associated with a zero detector 34, the output of which controls the opening of the switches 28 and 32. The counter $C_2$ is associated with a comparator 36 which is preset at the number N. The comparator 36 is controlled by the output of comparator 34 so as to deliver a signal at its output only at the end of the counting-down stage. If the state of the counter $C_2$ is higher than the number N ($\Delta C_2$ higher than N), the comparator 36 delivers a signal for incrementing by one unit a counter 38 which performs a counting-down operation and is preset at the value n. On the contrary, if the state of the counter $C_2$ is lower than the value N, the comparator 36 delivers a signal which initiates zero resetting of the counter 38. In actual fact, resetting of the counter 38 (for counting-down) also resets this latter to the preset value n. The counter 38 is associated with a zero detector 40. When the detector 40 has detected the presence of the zero state on the counter 38, said detector triggers an alarm signal.

The system 12 also comprises an alarm circuit which is not shown and is triggered if the temperature exceeds a predetermined maximum value. This system simply comprises a counter for receiving the frequency $F_1$ which is open during a fixed time interval and a logic circuit which trips when the contents of the counter attain a predetermined value.

The foregoing description relates to the treatment of the signal $F_1$ which corresponds to a temperature rise. A very difficult circuit would be provided for the treatment of the signal $F_3$ which corresponds to the detection of the infrared radiation frequency. The circuit which is contemplated in this case is capable of determining whether the variations of the signal $F_3$ occur at a frequency F which is characteristic of a fire. As is well known to those of ordinary skill in the art, such frequency measurements of comparison is easily accomplished by using counters. For example, the circuitry shown in FIG. 5 could be modified to compare the signal $F_3$ with the frequency F to determine if the variations of the signal $F_3$ are characteristic of a fire. Basically, all that is required is that the clock 30 provide an output frequency F, and the input to counter $C_1$ be the signal $F_3$. In operation, the switches 28 and 32 are closed, and counters $C_1$ and $C_2$ count up. After a predetermined period of time switches 28 and 32 are opened. At this point, either of two alternatives can be used. First and simplest, the contents of the counters $C_1$ and $C_2$ can be directly compared to determine if the signal $F_3$ is close to the frequency F. In the second alternative, the counters $C_1$ and $C_2$ can be used as bidirectional counters, and both counters can be made to count down in synchronism until the zero detector 34 stops the operation. At that point the count remaining in counter $C_2$ is compared with a predetermined threshold value. However, in this case, the comparator 36 would deliver an output signal when the state of counter $C_2$ is lower than a predetermined number indicating that the variations of the signal $F_3$ is close to the frequency F.

The logic circuit 12 can comprise additional logical elements for triggering the alarm only if the system of detection both of temperature and of infrared radiation give a positive response or on the contrary as soon as either of these modes of detection produces a positive result. It is also possible to form a weighted sum of unitary alarms as a function of both temperature and infrared radiation, thereby reducing the probability of false alarms. It is evident that circuits of this type are very simple to construct and therefore do not need to be described.

The example described in the foregoing corresponds to a complete detector which takes into account both a rise in temperature and variations in infrared radiation. It would clearly not constitute any departure from the invention to devise a fire detector which can be set to operate solely in response to temperature. In that case provision would be made only for the sensing device 2, the current-frequency converter 6, and a processing circuit 12 of simplified design insofar as it would only comprise the portion shown in FIG. 5. It is also possible to construct a fire detector which operates solely in response to infrared radiation. In this case, only the signal $F_3$ is applied to the processing circuit 12 and this latter comprises only the portion corresponding to the detection of infrared radiation frequency. A simplification can also be achieved by employing only the sensing device 4, the unmasked photodiode which is responsive both to temperature and to infrared radiation. There are in fact many cases in which the variation in leakage current resulting from a variation in temperature does not introduce any appreciable difficulty in order to determine the frequency employed for the purpose of triggering the infrared alarm and the differential circuit becomes unnecessary in such cases. Moreover, it is readily apparent that the particular types of sensing devices employed do not have any limitative value. Other types of sensing devices permitting either direct or indirect conversion of temperature for example into a current intensity could very readily be employed. It would also be possible to make use of sensing devices for converting temperature into a voltage, the sensing device being associated with a voltage-current converter.

Finally the alarm detector in accordance with the invention is clearly not limited to the detection of fires but is more generally intended to include any detector in which a sensing device delivers a signal to be converted into a frequency and in which said frequency is processed especially by determining the difference between successive counting operations in order to initiate the alarm signal.

Figure 4B:
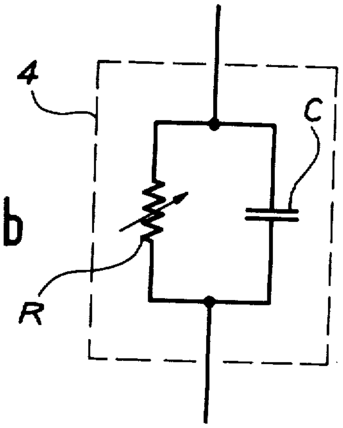
Figure 4C:
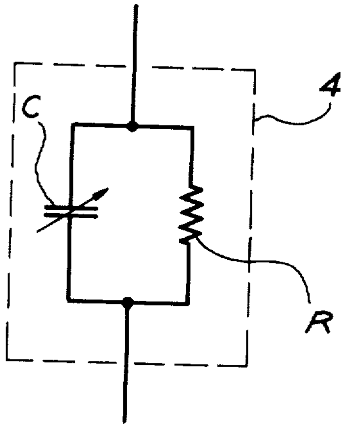

From this it follows that the diagram of FIG. 4 can be employed by dispensing with the diode 4 and making provision for the circuits shown in FIGS. 4*b* and 4*c*.

In the case of FIG. 4*b*, the sensing device is resistive and is associated with a fixed capacitor; the rate of discharge of the capacitor and therefore the output frequency of the signal-frequency converter is a function of the resistance which is in turn a function of the alarm quantity (e.g. temperature, humidity and so forth).

In the case of FIG. 4*c*, the sensing device is capacitive and is associated with a fixed discharge circuit, of which the resistor R is an example; the rate of discharge of the capacitor and therefore the output frequency of the signal-frequency converter is a function of the capacitance of the capacitor, which is in turn a function of the alarm quantity (e.g. pressure, humidity, proximity and so forth).

The sensing device can also be constituted by a smoke detector of the ionization chamber type. It is known that a sensing device of this type delivers an electrical signal whose amplitude is inversely proportional to the density of smoke. In this case, the relative variations in frequency are clearly no longer increases but decreases. The slight modifications to be made in the circuit described in the foregoing are within the capacity of those versed in the art.

Although the invention has been described relative to a specific embodiment thereof, it is not so limited and many modifications and variations thereof will be readily apparent to those skilled in the art in the light of the above teachings. It is therefore understood that within the scope of the appended claims the invention may be practiced otherwise than as specifically described.

What we claim is:

1. An infrared and temperature sensing device comprising a photodiode, means for applying a reverse-biasing voltage to said photodiode and means for withdrawing the leakage current from said photodiode, said leakage current being representative of infrared radiation impinging on said photodiode and the ambient temperature of the environment of said photodiode.

2. A temperature sensing device comprising a photodiode, means for applying a reverse-biasing voltage to said photodiode and means for withdrawing the leakage current from said photodiode, said photodiode being masked by a screen formed of material which is opaque to infrared radiations, said leakage current being representative of the ambient temperature of the environment of said photodiode.

3. An infrared sensing device comprising a first photodiode and a second photodiode in a common environment, said second photodiode being masked by a screen formed of a material which is opaque to infrared radiations, means for applying a reverse-biasing voltage to said first and second photodiodes, means for withdrawing a first leakage current from said first photodiode, said first leakage current being representative of infrared radiation impinging on said first photodiode and the ambient temperature of said common environment, means for withdrawing a second leakage current from said second photodiode, said second leakage current being representative of only the ambient temperature of said common environment, and means for combining said first and second leakage currents to produce a difference signal which is representative of only the infrared radiation impinging on said first photodiode.

* * * * *